US007714829B2

(12) United States Patent
Drader et al.

(10) Patent No.: US 7,714,829 B2
(45) Date of Patent: May 11, 2010

(54) METHOD FOR MAINTAINING THE WHITE COLOUR POINT IN A FIELD-SEQUENTIAL LCD OVER TIME

(75) Inventors: Marc Drader, Kitchener (CA); James Robinson, Elmira (CA); Jerry Mailloux, Waterloo (CA); Robert Lowles, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 748 days.

(21) Appl. No.: 10/957,606

(22) Filed: Oct. 5, 2004

(65) Prior Publication Data

US 2006/0071900 A1 Apr. 6, 2006

(51) Int. Cl.
*G09G 3/36* (2006.01)
*G09G 5/00* (2006.01)
*G09G 5/10* (2006.01)
*G06F 3/038* (2006.01)

(52) U.S. Cl. ........................ 345/102; 345/204; 345/690

(58) Field of Classification Search ................. 345/204, 345/690, 691, 102
See application file for complete search history.

(56) References Cited

U.S. PATENT DOCUMENTS

| | | | | |
|---|---|---|---|---|
| 4,455,576 | A | 6/1984 | Hoshi | |
| 4,975,692 | A | 12/1990 | Tateyama et al. | |
| 5,440,208 | A | 8/1995 | Uskali et al. | |
| 5,920,298 | A | 7/1999 | McKnight | |
| 6,188,379 | B1 | 2/2001 | Kaneko | |
| 6,888,529 | B2 * | 5/2005 | Bruning et al. | 345/102 |
| 6,891,525 | B2 * | 5/2005 | Ogoro | 345/102 |
| 6,897,837 | B1 | 5/2005 | Sakumoto et al. | |
| 7,006,064 | B2 | 2/2006 | Enomoto et al. | |
| 7,009,343 | B2 * | 3/2006 | Lim et al. | 315/150 |
| 7,079,107 | B2 * | 7/2006 | Miyake | 345/102 |
| 7,079,162 | B2 * | 7/2006 | Yamada et al. | 345/690 |
| 7,088,334 | B2 * | 8/2006 | Adachi et al. | 345/102 |
| 7,151,516 | B2 * | 12/2006 | Takeda et al. | 345/87 |
| 2003/0117364 | A1 | 6/2003 | Miyake | |
| 2004/0105053 | A1 * | 6/2004 | Ozeki et al. | 349/112 |
| 2006/0000963 | A1 * | 1/2006 | Ng et al. | 250/205 |

FOREIGN PATENT DOCUMENTS

| | | |
|---|---|---|
| EP | 1 077 444 | 2/2001 |
| EP | 1225557 A1 | 7/2002 |
| EP | 1 398 204 | 3/2004 |
| WO | WO 02/37454 | 5/2002 |

* cited by examiner

*Primary Examiner*—Sumati Lefkowitz
*Assistant Examiner*—Alexander S Beck
(74) *Attorney, Agent, or Firm*—McCarthy Tétrault LLP

(57) ABSTRACT

A field sequential liquid crystal display maintains its white colour point through compensation values to at least one colour light emitting diode that illuminates the display. The compensation values may be impedances to control the current or pulsing of the current source according to a pulse width modulation technique. A degradation curve may be used to calculate extrapolate the theoretical forward voltage of the light emitting diode. Additional complexity arises from the need for calculating uptime for multiple light emitting diodes of different colours. Brightness levels may also be factored in.

25 Claims, 11 Drawing Sheets

METHOD FOR MAINTAINING THE WHITE COLOUR POINT IN A FIELD-SEQUENTIAL LCD OVER TIME

FIELD OF THE INVENTION

The present invention relates to the field of liquid crystal display and, particularly, to the field of white colour point of a liquid crystal display screen.

BACKGROUND OF THE INVENTION

Field sequential liquid crystal displays (LCD) use three colour light emitting diodes (LED) to provide full colour displays. If the current supplied to the LEDs were finely regulated, the white colour point formed by the three colours would remain the same. Because the LEDs are voltage controlled, over time, the forward voltage (Vf) of each LED varies (increases) so that the calibrated white colour point formed by operation of three colours drifts. Thus, there is a need for a method for maintaining the white colour point for a field sequential LCD.

SUMMARY OF THE INVENTION

In addressing the problem of maintaining the proper white colour point during the life of the LCD, the forward voltages (Vf) of the light emitting diodes for illuminating the LCD are adjusted to calibrate the white colour point established as a combination of the light emitting diode colours. This adjustment may occur through monitoring the ON time and, optionally, brightness of each light emitting diode and comparing a resulting value with thresholds stored in software code, look up tables, arrays, hardwired values, etc.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Embodiments of present invention will now be described by way of example with reference to attached figures, wherein.

DETAILED DESCRIPTION

A method and device, especially a mobile station such as a handheld communications device, acts to stabilize a white colour point in a display by compensating for behavioural changes in the light source illuminating the display over time. Preferably, the display is a liquid crystal display and the light source includes light emitting diodes (LEDs) of different colours. The liquid crystal display may be operated at a rate of 30 or more frames per second. The LEDs of the light source preferably will include red, green, and blue colours. Other colour schemes, such as cyan, magenta, and yellow, are contemplated. Although directed to a liquid crystal display per se, the preferred use of the LCD is in a mobile station, such as a wireless portable handheld communications device. Cell phones and pagers are amongst the many handheld devices contemplated.

Figure 1:
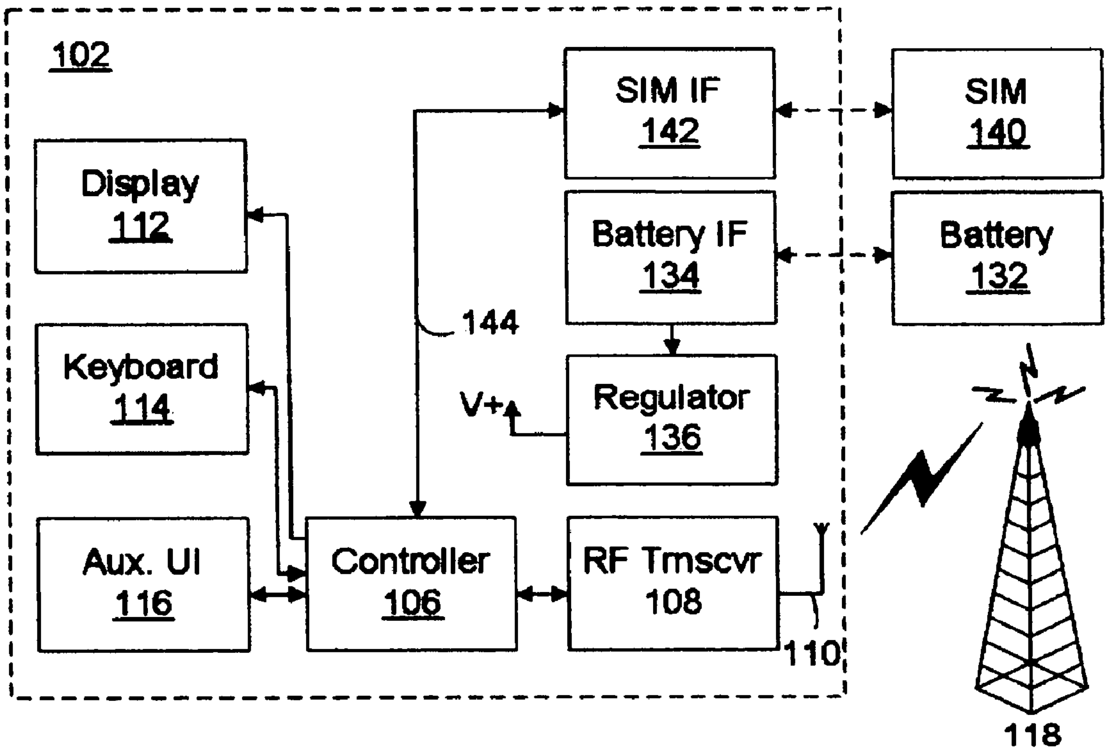
FIG. 1 is a block diagram that illustrates pertinent components of a wireless communications device that communicates within a wireless communication network according to the present invention.

FIG. 1 is a block diagram of a communication system 100 that includes a mobile station 102 that communicates through a wireless communication network. Mobile station 102 preferably includes a visual display 112, a keyboard 114, and perhaps one or more auxiliary user interfaces (UI) 116, each of which is coupled to a controller 106. Controller 106 is also coupled to radio frequency (R.F) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard (e.g., QWERTY or DVORAK), is normally provided for entering data for storage in mobile station 102, information for transmission to network, a telephone number to place a telephone call, commands to be executed on mobile station 102, and possibly other or different user inputs.

Mobile station 102 sends communication signals to and receives communication signals from the wireless network over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator. 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
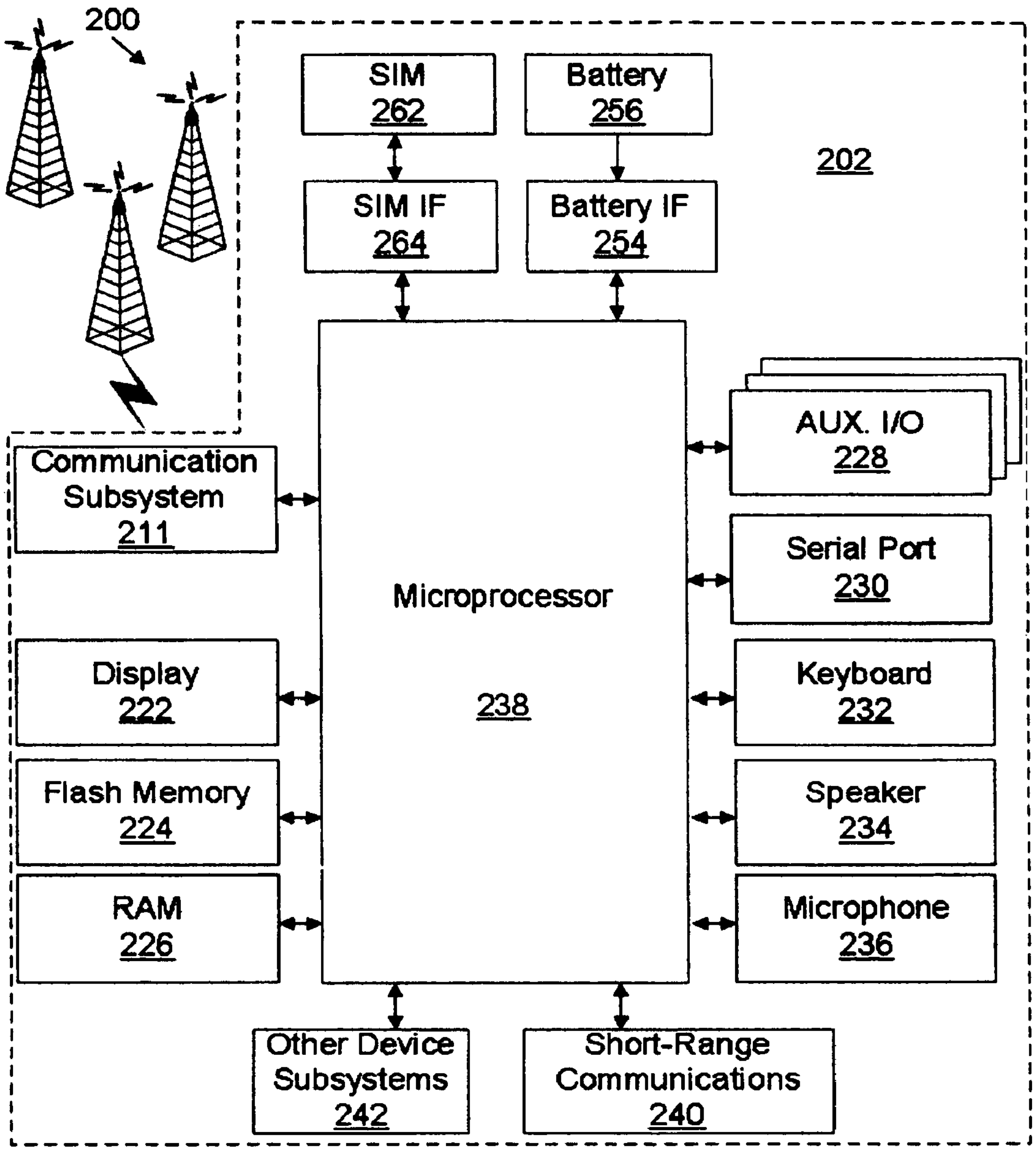
FIG. 2 is a more detailed diagram of a preferred wireless communications device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area. 100141 Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+to all of the circuitry.

Mobile station 202 includes a processor 238 (which is one implementation of controller 106 of FIG. 1) which controls overall operation of mobile station 202. Communication functions, including at least data and voice communications, are performed through communication subsystem 211. Processor 238 (e.g., a microprocessor or processing circuit or core) also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by processor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Processor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by processor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to processor 238. Processor 238 will preferably further process the signal for output to display 222, to auxiliary I/O device 228 or both as described further herein below with reference to FIGS. 3 and 4. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment, mobile station 202 is a multi-tasking handheld wireless communications device configured for sending and receiving data items and for making and receiving voice calls. To provide a user-friendly environment to control the operation of mobile station 202, an operating system resident on station 202 (not shown) provides a GUI having a main screen and a plurality of sub-screens navigable from the main screen.

Figure 3:
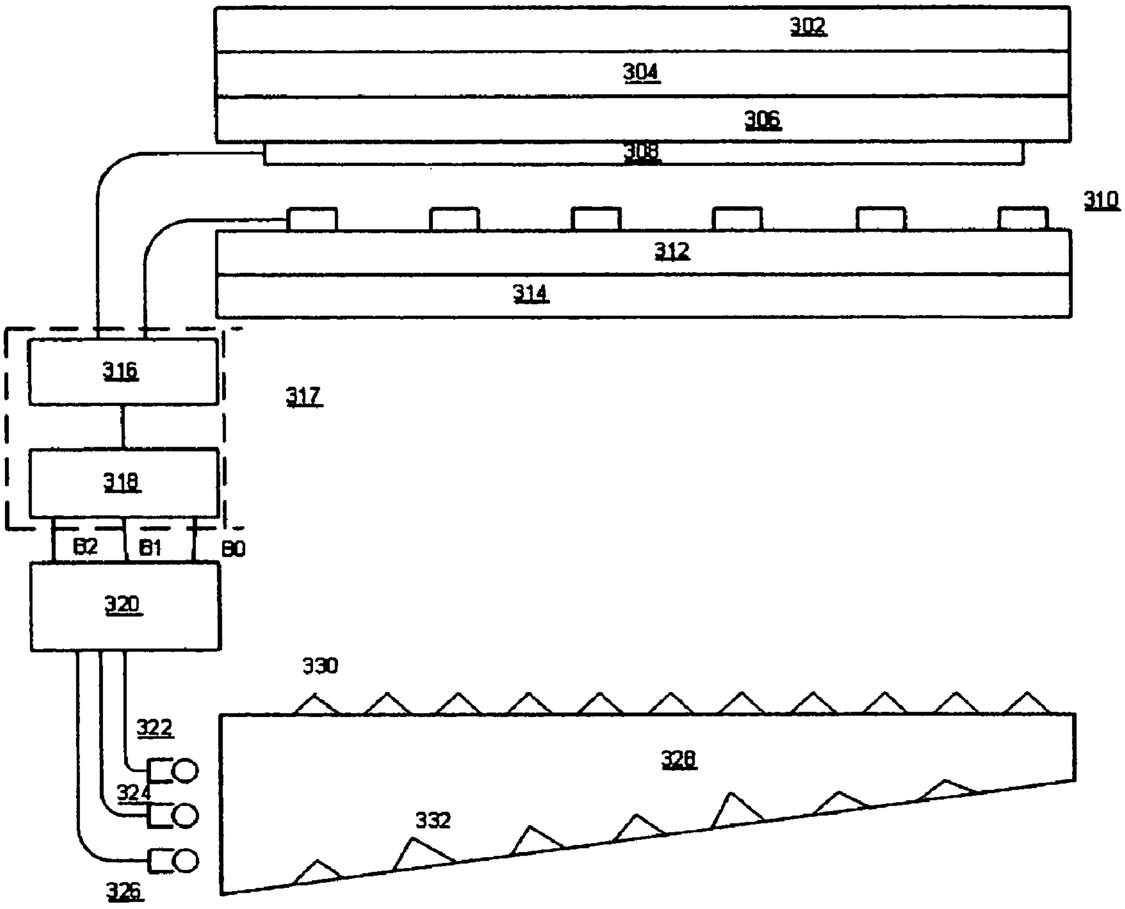
FIG. 3 illustrates an embodiment of a backlit liquid crystal display.

The liquid crystal display cell 222 is shown in greater detail in FIG. 3 in which a light source formed from multiple LEDs 322, 324, 326 is used as a backlight. Preferably, the LCD is a field sequential liquid crystal display (FS LCD). LCD controller 316 provides a voltage to the common electrode(s) 308 and the active elements 310 of the active matrix. The active elements are preferably thin film transistors. The common electrode(s) 308 and active elements are supported on substrates 306 and 312, respectively. Alternatively, the LCD may be a passive matrix. The LCD preferably contains a brightness enhancing film or layer 304 to optimize the distribution of light for a viewer and a diffusing layer. As the preferred liquid crystal material is super twisted nematic, polarizers 302 and 314 are used. The LCD controller 316 sets the pixel grey scale of the LCD. An optional processor 318 may coordinate synchronization of the LCD controller 316 with the light source controller 320. Preferably, the LCD controller 316 and the processor 318 are integrated into a single device 317, which may simply be referred to as an LCD controller having the capability of controlling a light source controller 320. The light source may be implemented by using red, green, and blue LEDs 322, 324, 326. In a specific embodiment, four green, four red, and two blue LEDs are used to provide full colour and/or black and white display. The LED controller 320 may sequence the three colours or may simultaneously energize LEDs of all of the colours and terminate power to the LEDs simultaneously. Other combinations of LEDs are contemplated. The light guide 328 may have a tapered block construction and may have approximately a trapezoidal, cross sectional form to more evenly distribute the light into the LCD. The light guide may also have uneven areas 330, 332 that scatter the light so as to avoid shadowing effects in the LCD image. Although uneven area 330 is shown to project out from the surface of the light guide 328 and uneven area 332 is shown to project inward to the surface of the light guide 328, the uneven areas may be arranged differently so long as the arrangement effectively scatters the light from the LEDs 322, 324, 326. The uneven areas may be abraded, molded, corrugated, chemically etched, or the like. Preferably, to maximize the utilization of light, the LEDs 322, 324, 326 and the light guide 328 are partially enclosed by a reflector such that the only opening is fully bounded by the light transmissive area of the LCD.

Figure 4:
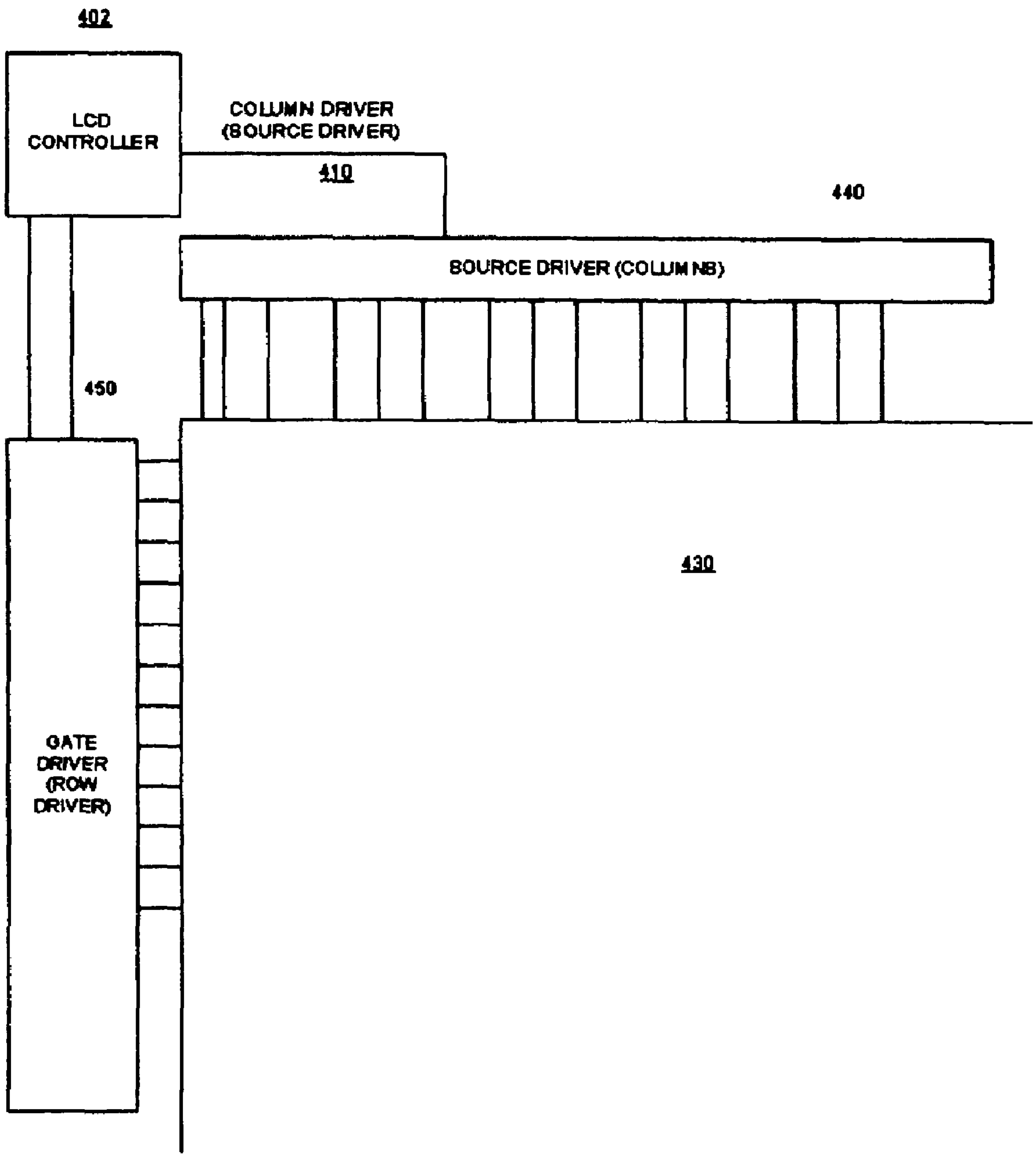
FIG. 4 illustrates an embodiment of the liquid crystal display and liquid crystal display controller.

FIG. 4 illustrates an embodiment of the LCD controller 402 and LCD 430 for the method. The LED controller may be internally adapted to provide a sequence of lights each centered on a specific wavelength according to the LEDs energized, followed by light generated simultaneously from all LEDs or at least two LEDs generating light centered on two different wavelengths. In FIG. 4, in synchronization with the LED controller, the LCD controller 402 creates a grey scale pattern for each light centred on a specific wavelength according to column driver 440 (source driver) according to data and control signals 410 and row selectors 450 (gate driver) from a data bit line and a LOAD LINE clock in a X-Y matrix arrangement. For a red light pattern, only pixels selectable by the column driver 440 may be set to a variable transmissive state to provide a desired grey scale pattern. Pixels that do not have a red component of light are turned off. For green and blue light patterns, similar procedures are followed. When all red, green, and blue colours are transmitted through a given pixel, that pixel may have a white or whitish appearance because of the blending of the three primary colours perceived by a viewer. Advantages in using the light source to determine colours include elimination of a colour filter layer, thus enhancing brightness of the display by reducing a light absorbing layer, and increasing the resolution as only one pixel is needed to provide full colour instead of separate red, green, and blue pixels. The size of a pixel is allowed to increase while resolution is improved; in other words, using the light source and not the LCD to determine colour optimizes substrate real estate usage.

Figure 5:
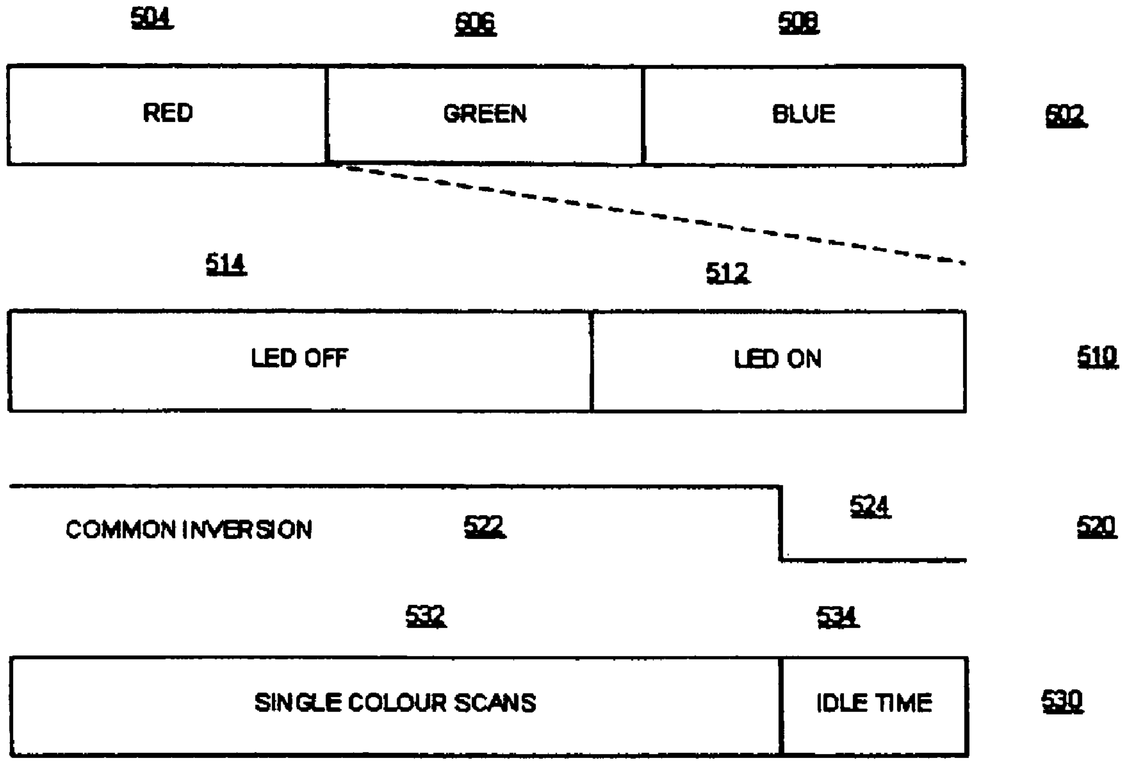
FIG. 5 illustrates a timing scheme for the light source and the display scans.

FIG. 5 illustrates a colour only mode in which either the entire display screen is in colour or the non-colour portion of the display screen is in the off state. In operation, pixel grey scale is achieved through pulses written to a pixel during scanning. Each colour frame 502 is divided into three parts (or fields) 504, 506, 508 for the three colours in full colour mode. Each pixel to be illuminated by a specific colour of light achieves a grey scale value from a pulse pattern into the source of the thin film transistor providing charge to the pixel. The pulse pattern (i.e., colour scans) includes multiple high and/or low pulses for each pixel. One pulse is applied to each colour pixel during a scan of the colour region that includes the colour pixel. During the colour region scan (or sweep) 532, the actual scanning occupies most of the time allotted 530 for a given colour. It is the successive scans of the colour pixels during a frame that establishes a grey scale value. A smaller portion of the time allotted in a scan period is idle time 534. During most of the scan period, the light source is turned off 514. In alternative embodiments, the light source may remain on for most or all of the scan period and/or the actual scanning may occupy a different portion of the time allotted for a given colour. Once the final grey scale value for a row or line of pixels is fairly well established, the light source (e.g., light emitting diode) is turned on 512. In some embodiments, during the light source turn on time, the common electrode of the display is inverted from a first voltage bias level 522 to a second voltage bias level 524 to prevent charge buildup in the liquid crystal that would degrade performance and damage the display. The inversion of the common electrode voltage occurs for each colour for each frame. Thus, for a red, green, and blue pixel LCD, the common electrode voltage is inverted three times. Other inversion modes are contemplated such as line inversion and pixel inversion. In line inversion, a given line may be alternately supplied through the source driver with voltages from a first set of a polarity and then supplied with voltages from a second set of a polarity opposite to that of the first set; that is, a non-inverting pair of voltages may be applied and an inverting pair of voltages may later be applied. In pixel inversion, alternate columns may be supplied for each row with voltage sets of opposing polarities.

Figure 6:
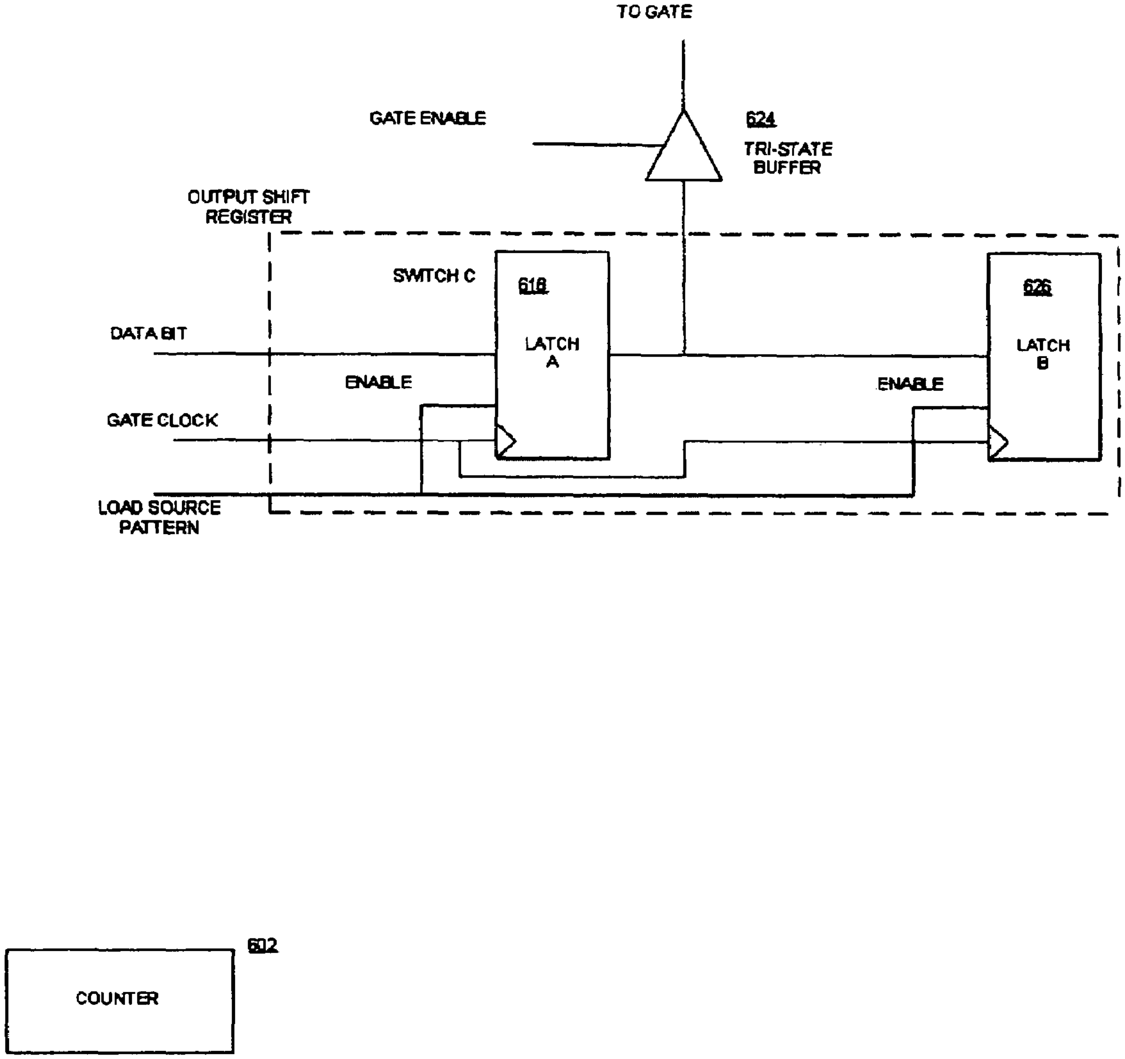
FIG. 6 illustrates an embodiment of a section of the gate line driver.

FIG. 6 represents a more specific embodiment. An output shift register (e.g., serial in/parallel out shift register) may be used for scanning the display screen. The shift register contains initialization values for the gate shift register. It preferably contains a one-hot encoding of the starting line number of display screen. (As used in an embodiment, one-hot encoding refers to a single active bit that is shifted through the shift register such that only one line at a time of pixels is written to from the source driver.) The shift register is loaded and then used to sweep the display. A LINE CLOCK rate is relatively high; for example, a 10 MHz clock rate may be used. The storage elements may be latches 618, 626 that latch data on the rising or falling edges of a clock, D type flip flops, or the like. A counter 602 may be used to hold the number of lines in the display screen.

Figure 7:
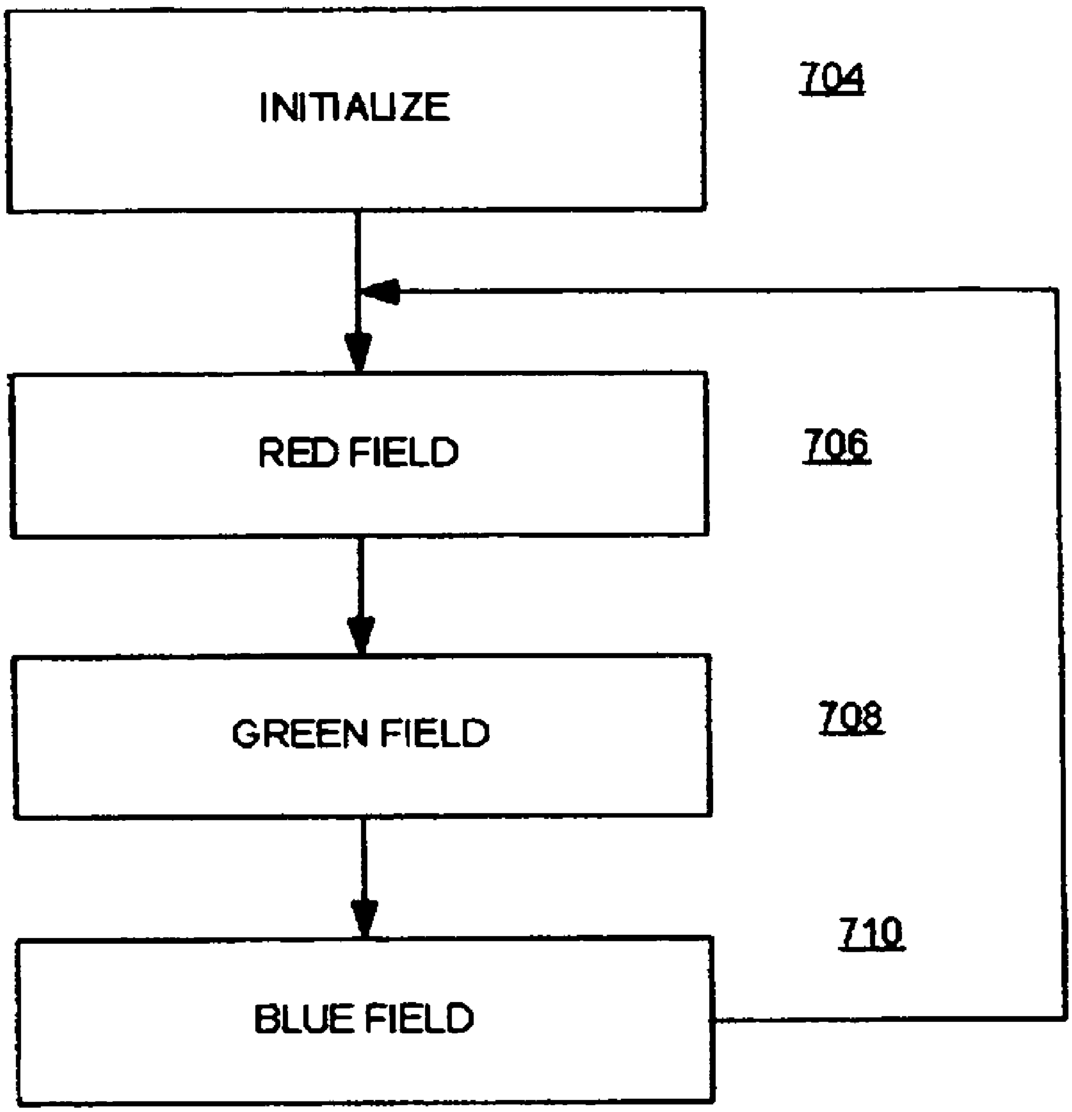
FIG. 7 illustrates a general overview of the method of illuminating an LCD.

FIG. 7 illustrates an overview of the embodiment of a method corresponding to the display scanning system. In the general method, initialization occurs 704 (e.g., registers are initialized) and the three colour fields are cycled through 706-710 through successive scans during a frame.

Figure 8:
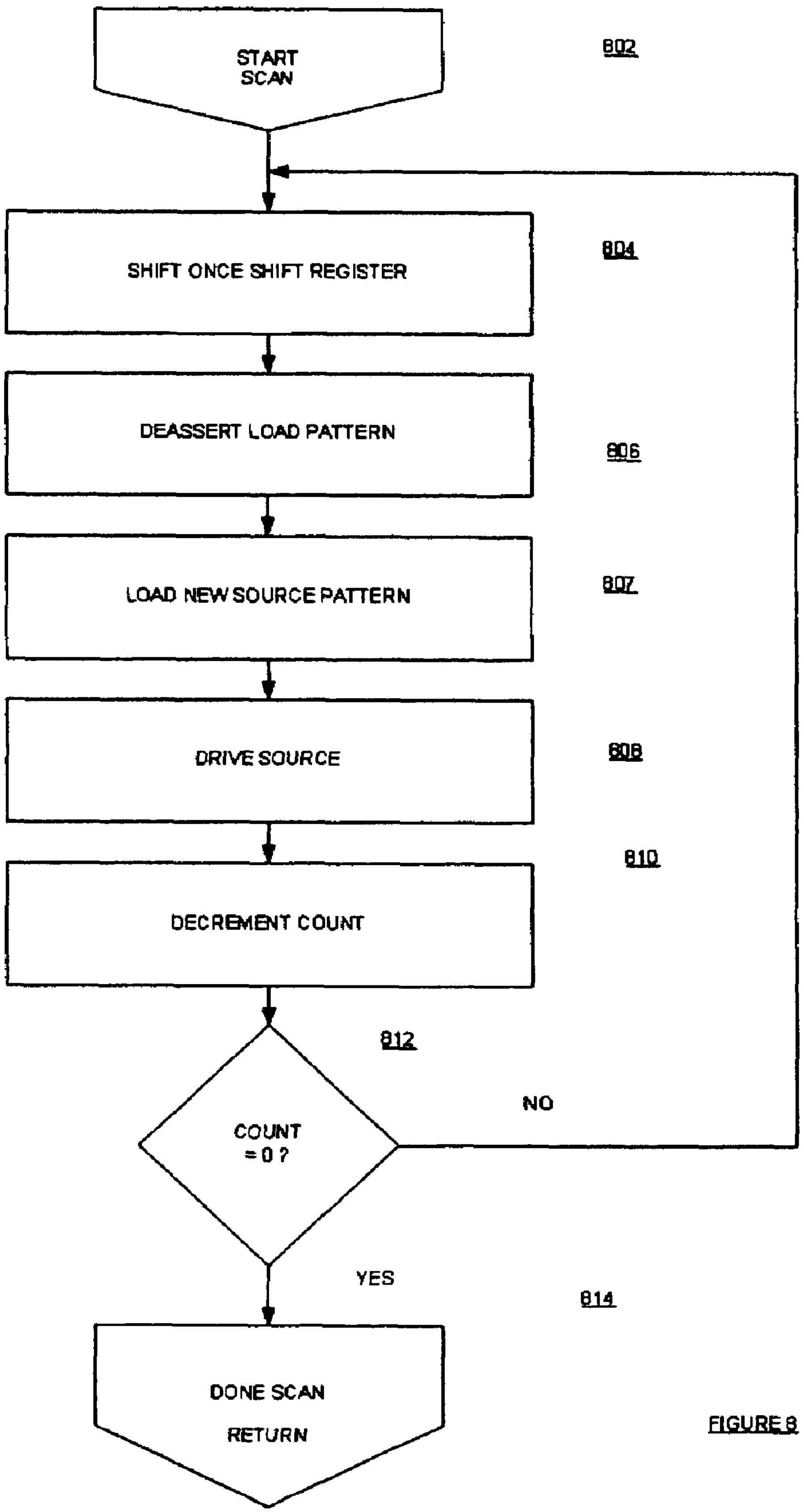
FIG. 8 illustrates further detail of an embodiment of the scanning for one colour within one frame.

FIG. 8 illustrates a more detailed embodiment of a scan for a field. The gate line driver is shifted once 804. The load pattern is deasserted 806. A new source pattern is loaded 807. The source lines on the display matrix are driven 808. The line count is reduced by one 810. As long as the counter does not expire (e.g., the line count remains greater than zero in a count down mode) 812, scanning resumes at step 804.

A field sequential liquid crystal display maintains its white colour point through compensation values to at least one colour light emitting diode that illuminates the display. A degradation curve may be used to calculate extrapolate the theoretical forward voltage of the light emitting diode. Additional complexity arises from the need for calculating uptime for multiple light emitting diodes of different colours. Brightness levels may also be factored in.

Figure 9:
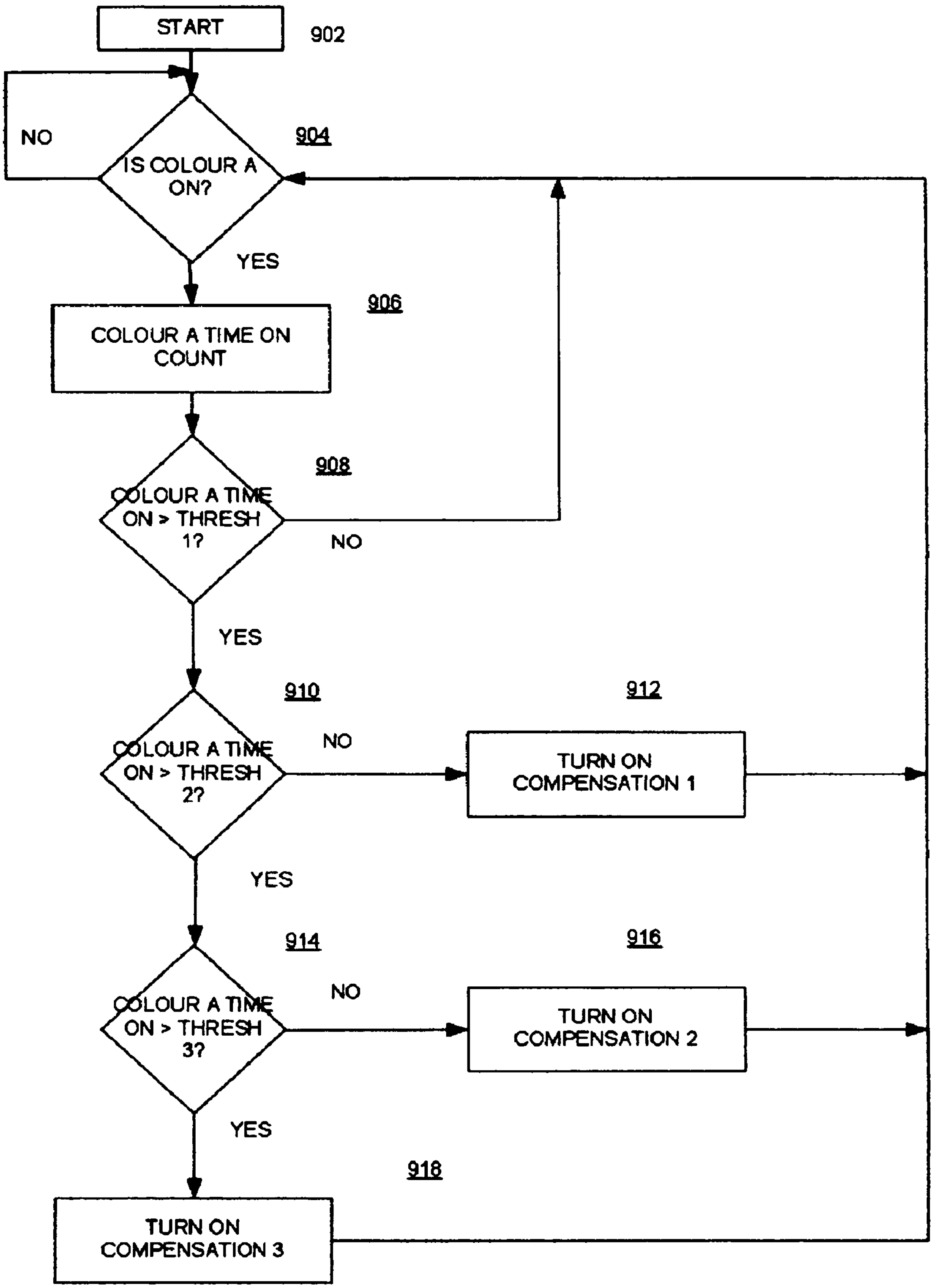
FIG. 9 illustrates an embodiment of a general method.

FIG. 9 illustrates an embodiment of a general method for determining the application of compensation to a light emitting diode of a single colour A according to the time of use or a more complicated function of time of use and brightness per use. It is to be understood that in a colour display, there will be two or more light emitting diodes of different colours—for example, red, green, and blue—or one or more light emitting diode that produces two or more colours. Colour A, as used here, may be any colour—including red, green, or blue. LED compensation is preferably performed through pulse width modulation (PWM) techniques or through current control. A determination is periodically made as to whether a light emitting diode is turned on 904. If so, then the time of use value is adjusted to correspond to the time the light emitting diode has been turned on 906. For example, the time of use value may be expressed as $\Sigma_{i=1}^{k}\{\text{unit time } \Delta t\}$ where the unit time At may be uniform or non-uniform in duration. A degradation curve may be used to calculate or extrapolate the theoretical forward voltage of an LED based on usage time. An algorithm may be used to keep track of display "uptime" and to insert Vf compensation values as required to pull a white point back to a specified value. In another embodiment, a more complicated function value is adjusted and stored in which the function correlates time of use and intensity of the light emitting diode being monitored to determine a cumulative intensity-time value. In this embodiment, the display brightness level must be tracked. For example, the cumulative intensity-time value may be expressed as $\Sigma_{i=1}^{k}\{\text{intensity during unit time I} * \text{unit time } \Delta t\}$ where the unit time Δt may be uniform or non-uniform in duration. Because LEDs of different colours (e.g., red, green, blue) are likely to be used, there is additional complexity for calculating uptime in a field sequential LCD since the amount of ON versus OFF time for red, green, and blue is different. Through multiple LEDs having two or more different colours, a synergy may arise that further complicates the adjustment values to maintain the white colour point. Thresholds are stored for determining the amount of compensation to be applied to the LED. The thresholds may be stored in a data structure, an array, a look up table (e.g., an aging table), or the like. If the time of use value or the cumulative intensity-time value for the light emitting diode exceeds a first threshold 908 and is less than or equal to a second threshold level 910, then a first compensation element or arrangement is turned on 912. A compensation element/arrangement may be resistive or capacitive in effect and includes one or more passive and/or active components, such as a resistor, a capacitor, or a transistor. In the case of PWM techniques, the compensation arrangement may entail the processor altering a set of pulses applied to the LED being controlled. For example, the number of pulses may be varied in a unit interval of time. If the time of use value or the cumulative intensity-time value for the light emitting diode exceeds a second threshold level 910, but not a third threshold level 914, a second compensation element or arrangement is switched on 916. In this case, the first compensation element or arrangement may be switched off or may remain switched on. If the time of use value or the cumulative intensity-time value for the light emitting diode exceeds a third threshold, then the third compensation element or arrangement is switched on 918. Either or both of the first and second compensation elements or arrangements may be switched off in this case.

Figure 11:
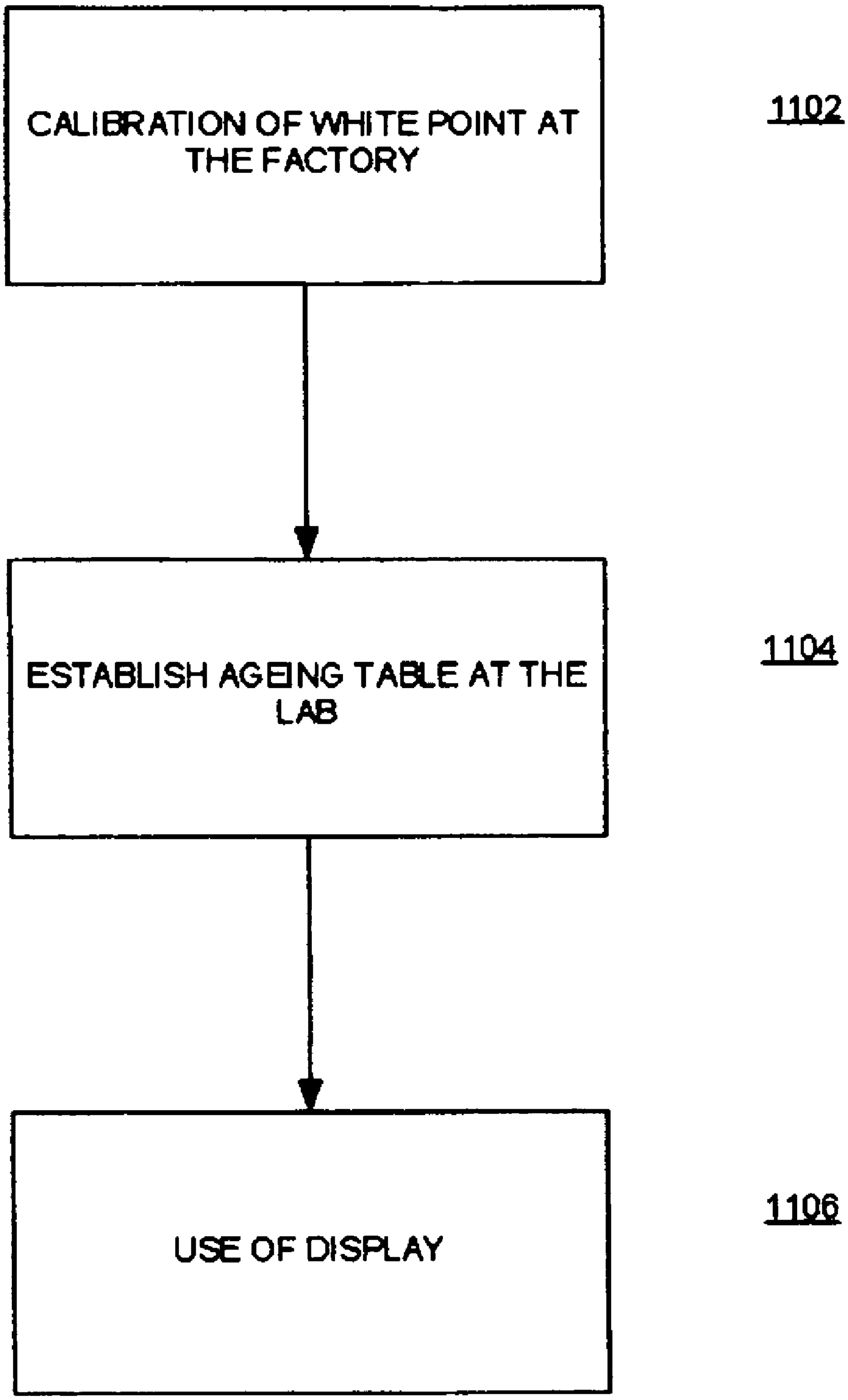
FIG. 11 illustrates an embodiment of a process for compensating the white colour point of a display.

FIG. 11 illustrates an embodiment of a general method for a process for determining the white point compensation of a field sequential liquid crystal display. In step 1102, a white point is calibrated at the factory. For a red, green, blue colour scheme in which red, green, blue light emitting diodes are used, the calibrated may be set by the following equations:

$$R_T = X_C \text{ seconds}$$

$$G_T = Y_C \text{ seconds}$$

$$B_T = Z_C \text{ seconds}$$

At some point, later or earlier than step 1102, an ageing table is created, step 1104, for the particular model, sampled batches, or individual field sequential liquid crystal displays. An exemplary ageing table is presented below:

| | $R_T$ | $G_T$ | $B_T$ |
|---|---|---|---|
| 1 hour | $\Delta_1$ | $\Omega_1$ | $\Phi_1$ |
| 10 hours | $\Delta_2$ | $\Omega_2$ | $\Phi_2$ |
| 1000 hours | $\Delta_3$ | $\Omega_3$ | $\Phi_3$ |
| 10,000 hours | $\Delta_4$ | $\Omega_4$ | $\Phi_4$ |

After steps 1102 and 1104, through actual usage of the FS LCD, the white colour point is compensated automatically. For example, when usage time is greater than or equal to one hour but less than 10 hours, the R, G, B values may be set as $R_T=X_C+\Delta_2$; $G_T=Y_C+\Omega_2$; and $B_T=Z_C+\Phi_2$.

Figure 10:
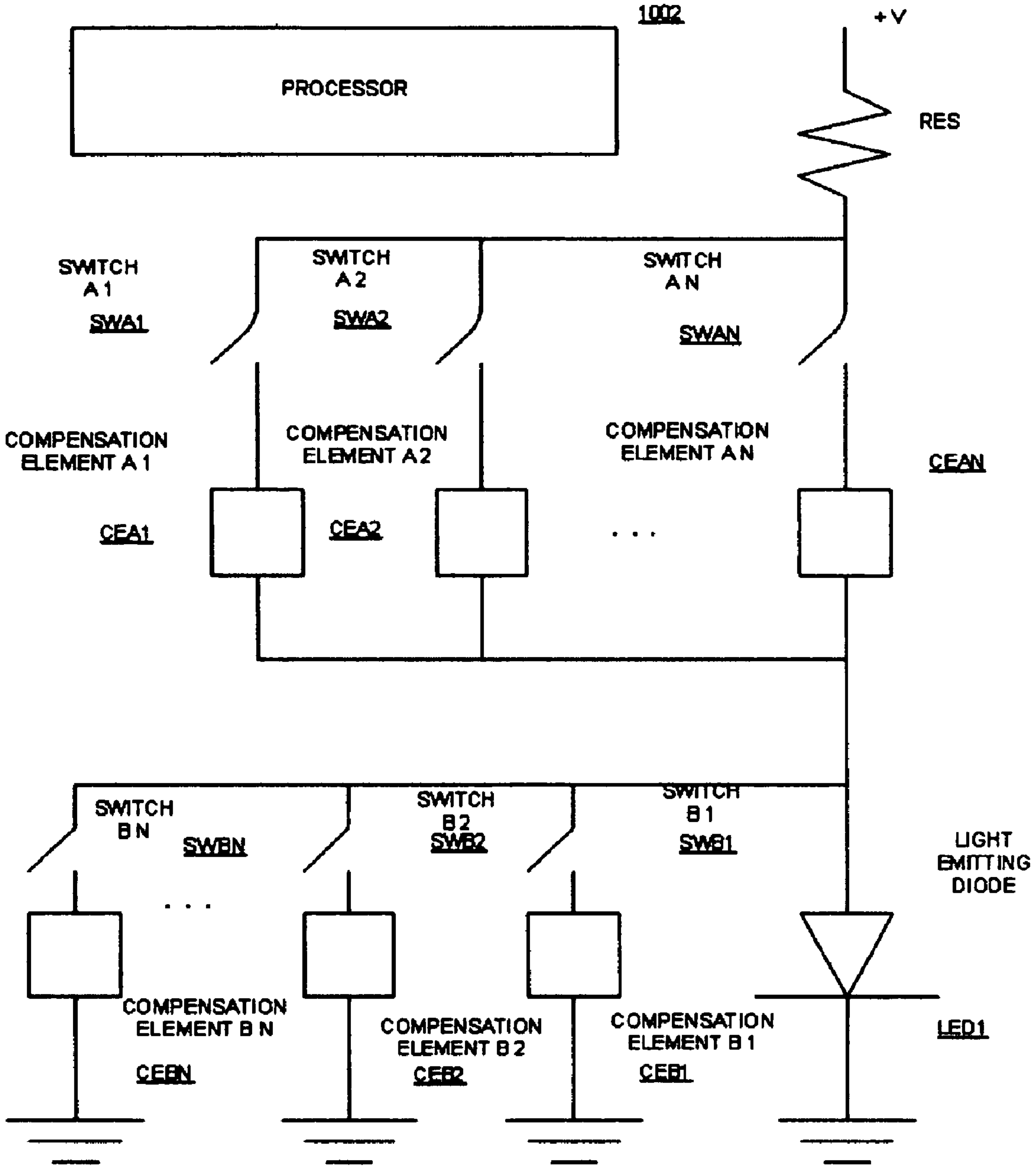
FIG. 10 illustrates a block diagram of an embodiment of an implementation of compensation circuitry for one light emitting diode.

FIG. 10 illustrates a block diagram of an arrangement of a current compensation scheme for a light emitting diode of one of the three colours. It is to be understood that light emitting diodes of one or both of the other colours will similarly be compensated for behavioural changes over the lifespan of the LED. In FIG. 10, light emitting diode LED1 may have series compensation A or parallel compensation B or both. The switches SWA and SWB may be implemented as complementary metal oxide semiconductor field effect transistors (CMOS FET) or as another active circuit element. A processor 1002 controls a switch internally or externally, such as one of switches SWA1, SWA2, and SWN. In an embodiment, only one switch of the A switches may be activated (i.e., turned) or two or more switches may be activated through processor 1002 or other control circuitry. Because it is not desirable to keep an LED on continuously, it is necessary that the current path from power +V through a current limiting resistor RES be interruptible, so a switch is always required at the power receiving end of the LED. The activated switch permits compensation element(s) A to modify the current and voltage applied to LED1. In an embodiment, it may be desirable to have one of the compensation elements A to have negligible resistance and capacitance such as through the absence of any impedance element CEA. Additionally or largely alternatively to series compensation elements A, compensation elements B may be placed in parallel with LED1. Processor 1002 or other control circuitry may also be used to control switching of switches SWB1, SWB2, through SWBN to activate compensation elements CEB1, CEB2, and CEBN. It is to be understood that FIG. 10 may be varied so as there may be a single switch A or multiple switches A in conjunction with zero or more switches B. Other compensation arrangements are contemplated. Preferably, processor 1002 and the compensation circuitry for the light emitting diode or diodes are incorporated within the same integrated circuit. Alternatively, processor 1002 and the compensation circuitry may be formed separately in which case the processor may control the switches through various interface circuitry through addressing information or may directly control the switches. In the case of pulse width modulation (PWM), the processor may directly control an LED without an impedance element by controlling the number of uniform pulses per unit time or by altering the pulse width of one or more pulses in a pulse train.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

We claim:

1. A method for maintaining a colour point for a plurality of light emitting elements used to illuminate a display of an electronic device, comprising:

determining a first value corresponding to activation data of each element of said plurality of light emitting elements;

comparing the first value against a first threshold to identify a compensation value for aging of said each element;

comparing the first value against a second threshold if the first value exceeds the first threshold;

if the first value is between said first and said second thresholds, then utilizing a first compensation value for said compensation value for the plurality of light emitting elements;

if the first value exceeds the second threshold, then utilizing a second compensation value for said compensation value for the plurality of light emitting elements;

adjusting an output to produce said colour on said display by adjusting an intensity for each said element utilizing its compensation value; and for a grey scale image to be generated on said display, at a pixel of said display setting said pixel to a transmissive state if said grey scale image at said pixel includes a colour to be activated; and not turning on said pixel if said grey scale image at said pixel does not include said colour.

2. The method of claim 1, further comprising if the first value exceeds the second threshold, then basing said compensation value on said second threshold.

3. The method of claim 1, wherein said display is a field sequential colour liquid crystal display.

4. The method of claim 1, wherein the first value corresponds to one of: the total time the plurality of light emitting elements have been activated; and a function of activation time and an intensity value of the plurality of light emitting elements.

5. The method of claim 4, wherein the function includes a sum of a plurality of intensity products, wherein each product of said plurality of products is an activation time of the light emitting elements multiplied by intensities during the activation time.

6. The method of claim 1, wherein said compensation value relates to a first voltage drop across a first impedance element switched in series with the plurality of light emitting elements located in a circuit between power and ground.

7. The method of claim 6, wherein said compensation value is further related to one of: a second voltage drop across a second impedance element switched in a parallel relationship with the plurality of light emitting elements; a third voltage drop across a third impedance element switched in series with the plurality of light emitting elements located between power and ground; and a fourth voltage drop across a fourth impedance element switched in a parallel relationship with the plurality of light emitting elements.

8. The method of claim 1, wherein adjusting said intensity of activation utilizes a pulse width modulation signal derived from said compensation value.

9. The method of claim 1, wherein said voltage is applied to one of: elements in a line in said display; a pixel in said display or said common electrode for a colour for said display.

10. The method of claim 9, wherein when said voltage is switched on said common electrode for said colour for said display, said voltage is switched for each colour of said display for each frame generated on said display.

11. The method of claim 9, wherein when said voltage signal is switched for elements in said line in said display, said line is alternatingly supplied through a source driver with voltages from a first set of a polarity and then supplied with voltages from a second set of a polarity opposite to that of the first set.

12. The method of claim 9, wherein when said voltage signal switched for said pixel in said display, alternating columns for each row of said display are supplied with voltage sets of opposing polarities.

13. The method for maintaining a colour point for a plurality of light emitting elements used to illuminate a display of an electronic device as claimed in claim 1, wherein data and control signals are applied to a column driver of said display and said column driver either sets said pixel to said transmissive state or does not turn on said pixel for said grey scale image.

14. The method for maintaining a colour point for a plurality of light emitting elements used to illuminate a display of an electronic device as claimed in claim 1, further comprising: switching a voltage applied to a common electrode for the display while said display is activated from a first bias voltage to a second, inverted bias voltage.

15. A field sequential liquid crystal display system that compensates for white colour point drift over time, comprising:

a liquid crystal display;

a light emitting diode for illuminating the liquid crystal display, the white colour point drift of the liquid crystal display being compensated through compensation applied to the light emitting diode;

a first module operating characteristics of said light emitting diode to identify a compensation element to compensate for aging of said light emitting diode, by comparing a first value corresponding to activation data the light emitting diode against a first threshold;

comparing the first value against a second threshold if the first value exceeds the first threshold;

if the first value is between said first and said second thresholds, then utilizing a first element for said compensation element; and if the first value exceeds the second threshold, then utilizing a second element for said compensation element;

a second module to adjust an intensity of an output of said light emitting diode to compensate for said white colour point drift by adjusting an intensity of activation of said light emitting diode by utilizing said compensation element; and a third module to set a transmissivity state for a pixel in said display when said display is generating a colour selected from one of red, green and blue for a grey scale image, said state selected from one of:

a transmissive state if said grey scale image at said pixel includes said colour; and a not turned on state at said pixel if said grey scale image at said pixel does not include said colour.

16. The field sequential liquid crystal display system of claim 15, wherein the liquid crystal display is used in a wireless handheld communications device.

17. The field sequential liquid crystal display system of claim 15, wherein said voltage is switched on one of: elements in a line, in said display; a pixel in said display or said common electrode for a colour for said display.

18. The field sequential liquid crystal display system of claim 17, wherein when said inverted voltage signal is applied to elements in said line in said display, said line is supplied in through a source driver with voltages in an alternating manner from a first set of a polarity and then supplied with voltages from a second set of a polarity opposite to that of the first set.

19. The field sequential liquid crystal display system of claim 17, wherein when said voltage signal switched on said pixel in said display, alternating columns for each row of said display are supplied with voltage sets of opposing polarities.

20. The field sequential liquid crystal display system of claim 15, wherein:

said first element is a first impedance element in a first switchable circuit in series with the light emitting diode;

said second element is a second impedance element in a second switchable circuit in parallel with the light emitting diode located between power and ground; and the first and second switchable circuits are selectively connected to the circuit of the light emitting diode to adjust the intensity of the output of said light emitting diode to compensate for said white colour point drift.

21. The field sequential liquid crystal display system as claimed in claim 15, further comprising:

a fourth module to selectively switch a voltage applied to a common electrode for the display while said display is activated from a first bias voltage to a second, inverted bias voltage.

22. The field sequential liquid crystal display system as claimed in claim 15, wherein said compensation element is one of: a first impedance element switched in a parallel relationship with the plurality of light emitting elements; a second impedance element switched in series with the plurality of light emitting elements located between power and ground; and a third impedance element switched in a parallel relationship with the plurality of light emitting elements.

23. A method for maintaining a colour point for a plurality of light emitting elements used to illuminate a display of an electronic device, comprising:

determining a first value corresponding to activation data of each element of said plurality of light emitting elements, the first value corresponding to one of: the total time the plurality of light emitting elements has been activated; and a function of activation time and an intensity value of the plurality of light emitting elements;

comparing the first value against a first threshold to identify a compensation value for aging of the plurality of light emitting elements;

comparing the first value a second threshold if the first value exceeds the first threshold;

if the first value is between said first and said second thresholds, then utilizing a first compensation value for said compensation value for the plurality of light emitting elements;

if the first value exceeds the second threshold, then utilizing a second compensation value for said compensation value for the plurality of light emitting elements;

adjusting an output to produce said colour on said display by adjusting an intensity for each said element utilizing its compensation value; and for a grey scale image to be generated on said display, at a pixel of said display setting said pixel to a transmissive state if said grey scale image at said pixel includes a colour to be activated; and not turning on said pixel if said grey scale image at said pixel does not include said colour.

24. The method of claim 23, wherein said compensation parameter relates to a voltage drop across a first impedance element switched in series with the plurality of light emitting elements located in a circuit between power and ground.

25. The method of claim 23, further comprising switching a voltage applied to a common electrode for the display while said display is activated from a first bias voltage to a second, inverted bias voltage.

* * * * *